(12) United States Patent
Li

(10) Patent No.: US 11,778,355 B2
(45) Date of Patent: Oct. 3, 2023

(54) METHOD FOR SEARCHING AND COUNTING GPON GEM FRAME

(71) Applicant: Airoha Technology (Suzhou) Limited, Suzhou (CN)

(72) Inventor: Feng-Bo Li, Suzhou (CN)

(73) Assignee: AIRONA TECHNOLOGY (SUZHOU) LIMITED, Suzhou (CN)

( * ) Notice: Subject to any disclaimer, the term of this patent is extended or adjusted under 35 U.S.C. 154(b) by 59 days.

(21) Appl. No.: 17/708,360

(22) Filed: Mar. 30, 2022

(65) Prior Publication Data

US 2023/0179895 A1   Jun. 8, 2023

(30) Foreign Application Priority Data

Dec. 3, 2021   (TW) ................................. 110145242

(51) Int. Cl.
 H04Q 11/00   (2006.01)
(52) U.S. Cl.
 CPC . H04Q 11/0067 (2013.01); *H04Q 2011/0064* (2013.01); *H04Q 2011/0073* (2013.01); *H04Q 2011/0086* (2013.01)

(58) Field of Classification Search
 CPC ................................................. H04Q 11/0067
 See application file for complete search history.

(56) References Cited

U.S. PATENT DOCUMENTS

| | | | |
|---|---|---|---|
| 2008/0155255 A1* | 6/2008 | Ohira | H04L 63/0428 713/160 |
| 2012/0195596 A1* | 8/2012 | Yang | H04L 47/6275 398/58 |
| 2022/0286206 A1* | 9/2022 | Ra | H04B 10/27 |

* cited by examiner

*Primary Examiner* — Shi K Li
(74) *Attorney, Agent, or Firm* — BACON&THOMAS,PLLC (57) ABSTRACT

A searching method is applicable to Gigabit-capable Passive Optical Network (GPON). The searching method includes: dividing a GPON Encapsulation Mode Port Identifier (GEM Port ID) of a GEM frame into a first portion GEM Port ID and a second portion GEM Port ID; performing a row look-up in a first memory array by using the first portion GEM Port ID, and performing a column look-up in the first memory array by using the second portion GEM Port ID; and identifying a specific bit's position in the first memory array, according to results of the row look-up and the column look-up in the first memory array, wherein the specific bit's position represents a GPON Encapsulation Mode Port (GEM Port) that is used by the GEM frame.

13 Claims, 6 Drawing Sheets

| | Description | Performance | Area |
|---|---|---|---|
| Referential Example | One memory array | 1 | 6 |
| The present invention | Two memory array | 1 | 1 |

Fig. 6

METHOD FOR SEARCHING AND COUNTING GPON GEM FRAME

CROSS REFERENCE TO RELATED APPLICATION

This application claims the benefits of the Taiwan Patent Application Serial Number 110145242, filed on Dec. 3, 2021, the subject matter of which is incorporated herein by reference.

BACKGROUND OF THE INVENTION

1. Field of the Invention

The present invention relates to a Passive Optical Network and, more particularly, to a method for searching and counting Gigabit-capable Passive Optical Network Encapsulation Mode frame (GPON Encapsulation Mode frame, or GEM frame) in the GPON architecture.

2. Description of Related Art

A Passive Optical Network (PON), also called a Passive Fiber-Optic Network, is an unpowered media network technology. This technology can avoid electromagnetic interference and lightning effect of external equipment, reducing the failure rate of lines and external equipment. As a result, the reliability of system is improved. The GPON architecture implements a point-to-multipoint topology in which a single optical fiber either distributes the optical power to multiple optical fibers by means of an unpowered fiber optic splitter or the optical power of multiple optical fibers is aggregated to the single fiber so as to serve multiple endpoints.

The Gigabit-capable Passive Optical Network (GPON) is a developing standard providing faster data-transmitting service for users, usually including internet, telephone, or TV broadcasting.

Figure 1:
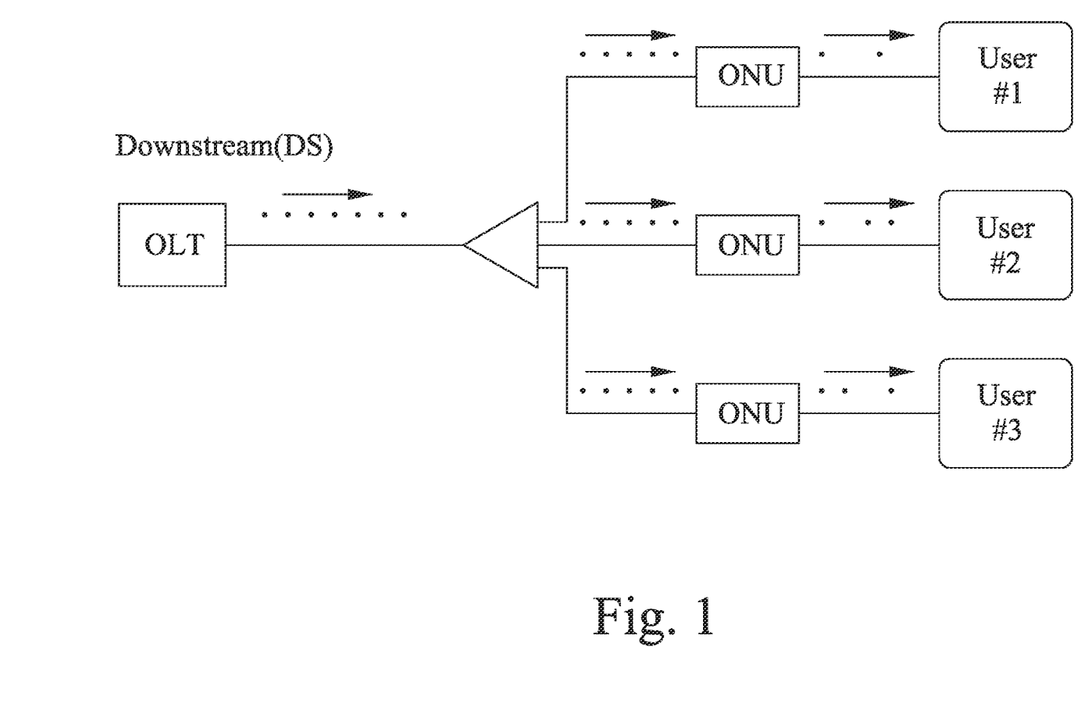
FIG. 1 is a schematic diagram of a GPON system architecture.

FIG. 1 is a schematic diagram of a GPON system architecture.

Figure 2:
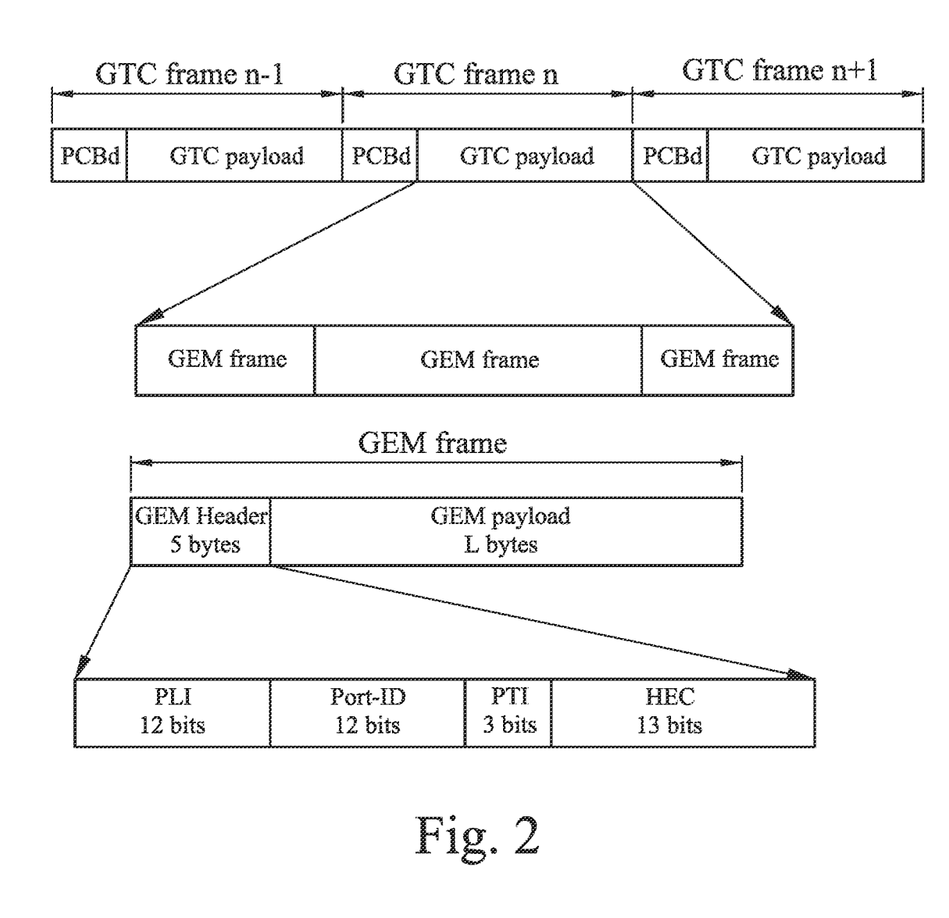
FIG. 2 is a schematic diagram of a downstream frame structure.

FIG. 2 is a schematic diagram of a frame structure of a downstream packet.

The GPON system uses optical fibers to connect together the Optical Line Terminal (OLT), the optical splitter, and the Optical Network Unit (ONU). Upstream and downstream uses different wavelengths for data transmission. The upstream transmission uses wavelength at 1310 nm, while the downstream transmission uses wavelength at 1490 nm. The GPON system uses one wavelength for downstream transmission and another wavelength for upstream transmission to transmit data on the same Optical Distribution Network by means of wavelength-division multiplexing (WDM). In addition, downstream data is transmitted in a broadcast manner, while upstream data is uploaded based on the principle of Time Division Multiple Access (TDMA).

Each GPON Encapsulation Mode Port (GEM Port) is labeled by a unique GPON Encapsulation Mode Port Identifier (GEM Port ID), and is globally allocated by an OLT. Each ONU needs to find out a GEM frame that belongs to it based on its GEM Port ID, wherein if a GEM frame does not belong to it, the ONU filters the GEM frame. In addition, the G.988 standard developed by the International Telecommunication Union (ITU) further requires the ONU to perform counting based on GEM frames. The counted items include the number of transmitted GEM frames, the number of received GEM frames, the number of transmitted payload bytes, and the number of received payload bytes.

The GEM header includes totally four parts, that is, a Payload Length Indicator (PLI) with 12 bits, a Port Identifier (Port ID) with 12 bits, a Payload Type Indicator (PTI) with 3 bits, and a Header Error Control (HEC) with 13 bits.

The GEM Port ID is introduced in consideration of multiple ONUs and multiple ports in PON network. Therefore, the GEM Port ID is particularly important in the present invention, since the ONU will identify the GEM frame based on the GEM Port ID.

With the developing GPON technology, the existing method of searching and counting GPON GEM frames requires larger and larger memory space in a chip.

Therefore, it is desirable to provide an innovative method for searching and counting a GPON GEM frame to mitigate or obviate the aforementioned problems.

SUMMARY OF THE INVENTION

The object of the present invention is to provide a method for searching and counting a GPON GEM frame, wherein the SRAM is realized through two memory arrays. According to the present invention, the method can find a corresponding counter by using a relatively small SRAM area.

According to the present invention, an innovative method for searching a GPON GEM frame is provided, and an innovative method for counting a GPON GEM frame is also provided accordingly.

In particular, according to one aspect of the present invention, a searching method, applicable to GPON, is provided. The searching method includes:

dividing a GEM Port ID of a GEM frame into a first portion GEM Port ID and a second portion GEM Port ID;

performing a row look-up in a first memory array by using the first portion GEM Port ID, and performing a column look-up in the first memory array by using the second portion GEM Port ID; and identifying a specific bit's position in the first memory array, according to results of the row look-up and the column look-up in the first memory array, wherein the specific bit's position represents a GEM Port that is used by the GEM frame.

Optionally, or preferably, the searching method further includes: determining if the GEM frame belongs to an ONU based on a value of the specific bit's position by the ONU.

Optionally, or preferably, the searching method further includes: performing a row look-up in the first memory array by using the first portion GEM Port ID to obtain a specific GEM Port.

Optionally, or preferably, the first memory array has a plurality of memory rows, the plurality of memory rows having respective row addresses, and wherein data stored in the plurality of memory rows comprise a plurality of bits, each bit representing a respective GEM Port.

Optionally, or preferably, the second memory array is configured such that, except data in a $0^{th}$ memory row, data in a $M^{th}$ memory row are represented by $\Sigma_{N=0}^{M-1} Q_N$, and wherein M is in a range from 0 to 255, $Q_N$ being a number of valid bits in a $N^{th}$ row of the first memory array, $\Sigma$ being a summation operator, and wherein the second memory array is configured to define a value in the $0^{th}$ memory row as 0.

According to another aspect of the present invention, a GPON ONU integrated circuit is provided. The GPON ONU integrated circuit includes a first memory array and a second memory array. The first memory array, which is constituted by a plurality of first memory rows, includes a plurality of memory cells, each memory cell representing a GEM Port, data stored in each memory cell indicating a validity of a relevant GEM Port. The second memory array is constituted by a plurality of second memory rows, wherein an order of arranging the second memory rows in the second memory array is the same as an order of arranging the first memory rows in the first memory array, and wherein a second data stored in the second memory row is a total number of valid GEM Ports of all memory rows arranged before a corresponding first memory row, and wherein the second data is associated with a counter index.

Optionally, or preferably, the plurality of first memory rows and the plurality of second memory rows have the same row addresses.

Optionally, or preferably, a number of bits in the second memory rows needs to be equal to or larger than a maximum number of GEM Ports that the GPON ONU integrated circuit supports.

According to yet another aspect of the present invention, a searching method applicable to the above-mentioned GPON ONU integrated circuit is provided. The searching method includes:

identifying a first memory cell by performing a look-up in the first memory array with a GEM Port ID under test;

obtaining the second data by performing a row look-up in the second memory array with the GEM Port ID under test, in response to an event that the first memory cell is valid;

identifying the counter index based on the second data.

Optionally, or preferably, the step of identifying the counter index based on the second data includes: identifying the counter index based on the GEM Port ID under test and the second data.

Optionally, or preferably, the searching method further includes:

dividing the GEM Port ID into a first portion GEM Port ID and a second portion GEM Port ID, wherein the step of identifying a first memory cell by performing the look-up in the first memory array with the GEM Port ID under test includes:

performing a row look-up in the first memory array by using the first portion GEM Port ID; and performing a column look-up in the first memory array by using the second portion GEM Port ID.

Optionally, or preferably, the step of obtaining the second data by performing the row look-up in the second memory array with the GEM Port ID under test, in response to an event that the first memory cell is valid includes:

identifying a corresponding row in the plurality of second memory rows by performing the row look-up in the second memory array with the first portion GEM Port ID; and providing the second data by the corresponding row in the second memory rows.

Optionally, or preferably, the step of the identifying the counter index based on the GEM Port ID under test and the second data further includes:

obtaining a summation result by summing up the second portion GEM Port ID and the second data; and deeming the summation result as the counter index.

Other objects, advantages, and novel features of the invention will become more apparent from the following detailed description when taken in conjunction with the accompanying drawings.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

The so-called "include", "comprise", "have", or "contain" refers to include but not limited thereto, except otherwise specified.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, a terminal or a server may include the aforementioned element(s), or be implemented in the aforementioned manner(s).

REFERENTIAL EXAMPLE

Figure 3:
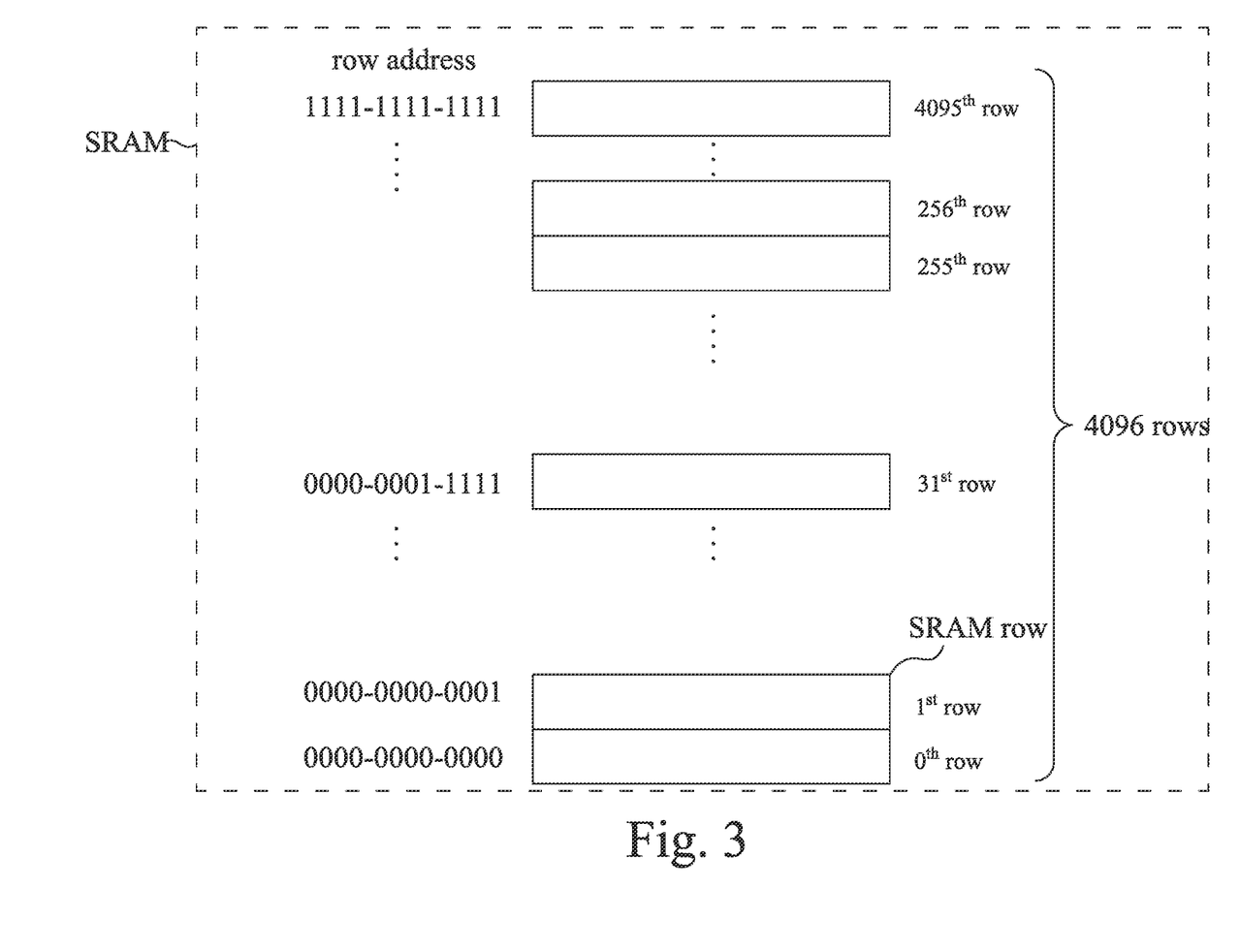
FIG. 3 is a schematic diagram of a configuration of a Static Random Access Memory array according to a referential example.
Figure 4:
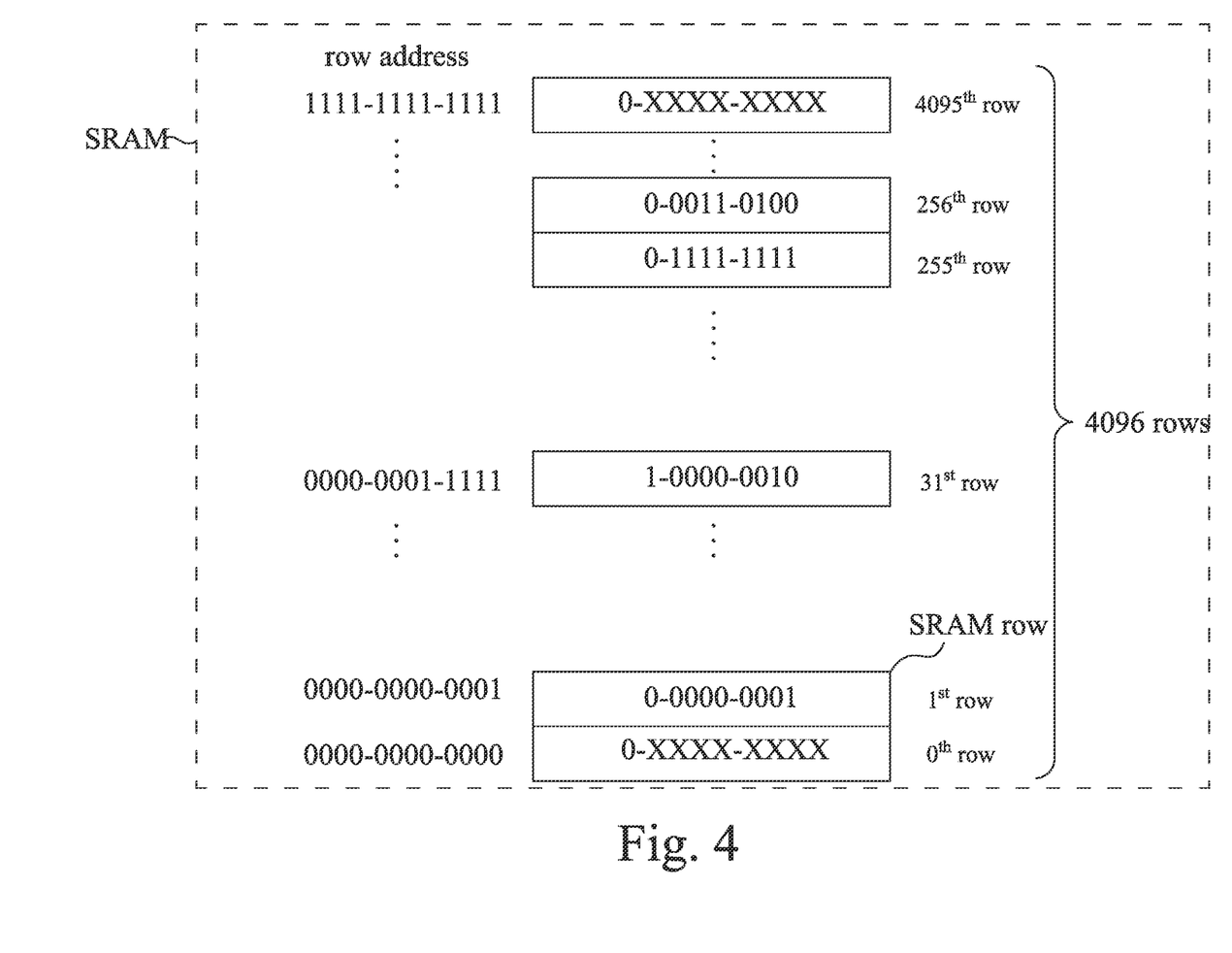
FIG. 4 shows data stored in the SRAM array of FIG. 3.

FIG. 3 is a schematic diagram of a configuration of a Static Random Access Memory (SRAM) array according to a referential example. FIG. 4 shows data stored in the SRAM array of FIG. 3. A method for searching a GEM frame by an ONU is described in the following description according the referential example with reference to FIGS. 3 to 4.

The International Telecommunication Union (ITU) standard requires counting a GEM frame received by a GEM Port for a specific ONU. For this reason, it needs to find out a counter set in correspondence with the GEM Port, and uses the counter set to perform counts, wherein the counter set includes at least one counter.

In general, an OLT supports 4096 GEM Ports. As previously mentioned, a "GEM Port ID" is used to identify a GEM Port, so it needs 4096 GEM Port IDs. A row address of an SRAM is a possible way to implement the GEM Port ID. For this reason, an ONU provides 4096 RAM row addresses individually corresponding to the 4096 GEM Ports. Conversion from the decimal number 4096 into a binary number requires 12 bits, wherein the Most Significant Bit (MSB) in the 12 bits is represented by gpid[11], the Least Significant Bit (LSB) in the 12 bits is represented by gpid[0], and the whole data is represented by gpid[11:0]. In the present specification, gpid is an abbreviation of GEM Port ID.

With reference to FIG. 3, in the referential example, an SRAM of an ONU includes 4096 SRAM rows. The row address of the $0^{th}$ SRAM row is 0000-0000-0000, and the row address of the $1^{st}$ SRAM row is 0000-0000-0001, and so on, and finally the row address of the $4095^{th}$ SRAM row is 1111-1111-1111. The symbol "-" is added for ease of reading, and it is not necessary to add them in the row address.

During operation, if the OLT provides a GEM frame with a GEM Port ID "0000-0000-0000", the ONU can identify that it corresponds to the $0^{th}$ SRAM row; similarly, if the OLT provides a GEM frame with a GEM Port ID "0000-0000-0001", the ONU can identify that it corresponds to the $1^{st}$ SRAM row, and so on.

After the ONU identifies the corresponding SRAM row based on the GEM Port ID of the GEM frame, the data stored in the corresponding SRAM row can be outputted from the SRAM.

With reference to FIG. 4, an SRAM row stores data with 9 bits, in which MSB is bit[8], LSB is bit[0], and the whole data is represented by bit[8:0]. For example, the data stored in the $0^{th}$ SRAM row is 0-XXXX-XXXX, and the data stored in the $1^{st}$ SRAM row is 0-0000-0001. The data stored in the SRAM rows of FIG. 4 is given merely by way of example.

In the referential example, the bit[8], also the MSB, is used to indicate if a specific GEM frame belongs to a specific ONU. If MSB=1, it means that the specific GEM Port ID belongs to the specific ONU, that is, the specific GEM frame belongs to the specific ONU. If MSB=0, it means that the specific GEM Port ID does not belong to the specific ONU, that is, the specific GEM frame does not belong to the specific ONU.

The remaining 8 bits, i.e. bit[7:0], are used to indicate a specific counter set that is used by a specific GEM frame, in other words, bit[7:0] are used as a counter index. Since an ONU supports at most 256 GEM Ports and since the $8^{th}$ power of 2 equals to 256, the counter index is represented by 8 bits and designated as bit[7:0].

In order to explain the method for searching GEM frame in the referential example in more detail, suppose that in a particular case, a specific ONU merely supports one GEM Port, and in such case, only one SRAM row shows that MSB=1, which is the $31^{st}$ SRAM row in the referential example, but it is merely shown by way of example, and it can be another row in other examples.

During operation, if the OLT provides a GEM frame with GEM Port ID=0, i.e. gpid[11:0]=0000-0000-0000$_2$=0$_{10}$, then the ONU identifies that it corresponds to the $0^{th}$ SRAM row. Then, the data "0-XXXX-XXXX" stored in the $0^{th}$ SRAM row can be outputted. In this data, MSB=0, so it can be determined that the GEM frame does not belong to the ONU, and accordingly it is not necessary to further identify the counter of the GEM frame. It should be noted here that the subscript, such as "2" in the "0000-0000-0000$_2$", indicates that the serial number is represented by a binary system, and the subscript, such as 10 in 0$_{10}$, indicates that the serial number is represented by a decimal system. These subscripts will be applied in the following description.

During operation, if the OLT provides the GEM frame with GEM Port ID=31, i.e. gpid[11:0]=0000-0001-1111$_2$=31$_{10}$, then the ONU can identify that it corresponds to the $31^{st}$ SRAM row. Then, the data "1-0000-0010" stored in the $31^{st}$ SRAM row can be outputted. In the data, MSB=1, so it can be determined that the GEM frame belongs to the ONU. In this case, it needs to further identify based on the counter index bit[7:0]=0000-0010 which counter set is used by the GEM frame. The counter index bit[7:0]=0000-0010 can be, for example, served as an SRAM row address in another memory space (not illustrated) of SRAM, so as to identify the counter set for the GEM frame.

In the above assumed specific case, one ONU supports one GEM Port. Anyway, an ONU can at most support 256 GEM Ports, that is, in the 4096 SRAM rows, there are at most 256 SRAM rows with MSB=1. In other words, MSB of the remaining 3840 SRAM rows is 0 (4096−256=3840). The present invention recognizes that, once MSB=0, the remaining 8 bits are useless. In other words, at least 3840×8=30720 bits of the memory space are wasted, and is inefficient in utilizing the SRAM area.

Therefore, it is desirable to provide an innovative method for searching a GPON GEM frame, and an innovative method for counting a GPON GEM frame.

(Method for Searching a GPON GEM Frame of the Present Invention)

A method for searching a GPON GEM frame of the present invention is applicable to a GPON architecture. The GPON architecture includes an OLT, a splitter, an ONU, and a plurality of end users. The ONU includes an integrated circuit, which includes an SRAM. However, the present invention is not limited to the SRAM, and other kinds of memories are also possible. In the present invention, the SRAM is provided with a first memory array and a second memory array.

Figure 5:
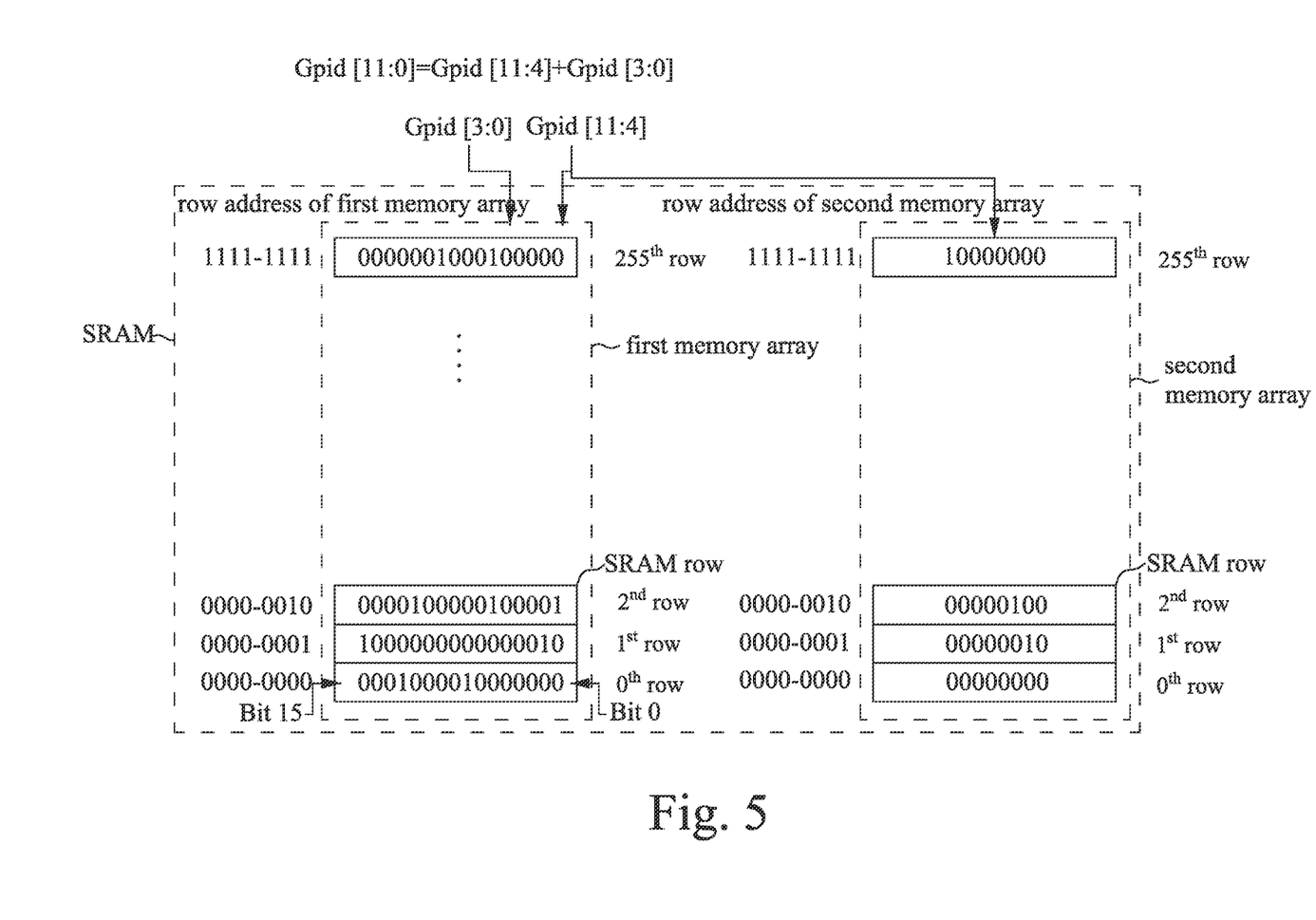
FIG. 5 is a schematic diagram of a configuration of memory arrays in a first memory array and a second memory array in an SRAM according to an embodiment of the present invention.

FIG. 5 is a schematic diagram of a memory array configuration of a first memory array and a second memory array in an SRAM according to an embodiment of the present invention. The method for searching a GPON GEM frame according to an embodiment of the present invention will be described with reference to FIG. 5 in the following description.

At first, the configuration and operation method of the first memory array and the second memory array of the present invention are described as follows. It should be understood that, in order to solve the problem of low utilization rate of the SRAM area on the basis that an OLT supports 4096 GEM Ports, the configuration is designed.

(Configuration of First Memory Array)

In a general embodiment, the first memory array has a plurality of first memory rows, the first memory rows are SRAM rows in the present invention, and each SRAM rows has a corresponding row address. In a specific embodiment, the first memory array is configured to have 256 SRAM rows.

Since conversion from the decimal number 256 into a binary number requires 8 bits, the row address of the first memory array has 8 bits. For example, in FIG. 5, the row address of the $0^{th}$ SRAM row is 0000-0000, the first address of the $1^{st}$ SRAM row is 0000-0001, and so on, and finally the row address of the $255^{th}$ SRAM row is 1111-1111.

An SRAM row in the first memory array includes 16 memory cells to store data with 16 bits, and these 16 bits from LSB to MSB are labeled as Bit 0, Bit 1, Bit 2, Bit 3, Bit 4, Bit 5, Bit 6, Bit 7, Bit 8, Bit 9, Bit 10, Bit 11, Bit 12, Bit 13, Bit 14, and Bit 15, individually. Each position of bits represents one GEM Port. For example, Bit 0 in the $0^{th}$ SRAM row represents a first GEM Port in the $0^{th}$ SRAM row, Bit 15 in the $0^{th}$ SRAM row represents a $16^{th}$ GEM Port, and so on.

Thus, each SRAM row can be used to represent 16 GEM Ports, and there are totally 256 SRAM rows in the first memory array, so the first memory array can be used to represent 4096 GEM Ports (256×16=4096).

(Configuration of Second Memory Array)

Before the second memory array is described in detail, it should be particularly noted that, the purpose of arranging the second memory array is to sequentially sum up a quantity of valid bits in each SRAM row of the first memory array, so as to obtain a "summation value", and the summation value will be further stored into the second memory array.

In a general embodiment, the second memory array has a plurality of second memory rows. In the present invention, the second memory rows are SRAM rows, and each SRAM rows has a corresponding row address. In a specific embodiment, the second memory array is configured to have 256 SRAM rows. As previously mentioned, since conversion from the decimal number 256 into a binary number requires 8 bits, the row address of the second memory array has 8 bits. For example, in FIG. 5, the row address of the $0^{th}$ SRAM row is 0000-0000, the first address of the $1^{st}$ SRAM row is 0000-0001, and so on, and finally the row address of the $255^{th}$ SRAM row is 1111-1111. It can be seen that an order of arranging the second memory rows in the second memory array is the same as an order of arranging the first memory rows in the first memory array. In addition, the first memory row and the second memory row have the same row addresses.

An SRAM row of the second memory array includes 8 memory cells to store data with 8 bits. Such 8-bit configuration is designed on the basis that each ONU at most supports 256 GEM ports, and therefore there are at most 256 valid bits in the first memory array. In general, the number of bits of the second memory row needs to be equal to or more than the maximum number of GEM Ports that integrated circuits can support.

In one embodiment, in the second memory array, the $0^{th}$ SRAM row is configured to store 0 of the data (value), and other SRAM rows are configured to store summation values. The summation value is calculated as follows: the data (value) stored in the $M^{th}$ SRAM row of the second memory array is $$\sum\nolimits_{N=0}^{M-1} Q_N,$$

wherein M is in a range from 0 to 255, $Q_N$ is a number of valid bits in the $N^{th}$ row of the first memory array, Σ is a summation operator, and N is summation subscript.

In the example of FIG. 5, $Q_0$ is the number of valid bits in $0^{th}$ SRAM row in the first memory array, the data stored in the $0^{th}$ SRAM row is 0001000010000000, which has two 1's, and thus $Q_0$=2; similarly, $Q_1$ is the number of valid bits in the $1^{st}$ SRAM row in the first memory array, the data stored in the $1^{st}$ SRAM row is 1000000000000010, and thus $Q_1$=2.

Next, summation values for each SRAM row in the second memory array are calculated. At first, the data (value) stored in the $0^{th}$ SRAM row of the second memory array is $0_{10}$ by definition, which can be represented as a binary number $00000000_2$.

The data stored in the $1^{st}$ SRAM row of the second memory array is calculated to be $Q_0=2_{10}$ according to $$\sum\nolimits_{N=0}^{M-1} Q_N,$$

which can be represented as a binary number $00000010_2$. The data stored in the $2^{nd}$ SRAM row of the second memory array can be calculated according to $$\sum\nolimits_{N=0}^{M-1} Q_N$$

as well, which is equal to the summation of $Q_0$ and $Q_1$, that is $4_{10}$, and can be represented as a binary number $00000100_2$.

In this way, the first memory array and the second memory array in the SRAM is fully constructed. It should be noted that, the data stored in each SRAM row of the first memory array and the second memory array of FIG. 5 are merely exemplary. The specific steps of searching the GPON GEM frame according to the present invention will be described in the following description.

(Specific Description of Method for Searching a GPON GEM Frame)

In the following description, two non-limiting examples are provided, in which ONUs perform look-up processes for a GEM frame with GEM Port ID=0 and for a GEM frame with GEM Port ID=32.

The first example is GEM Port ID=0, that is, gpid[11:0] $=0_{10}=000000000000_2$. According to the principle of the present invention, gpid[11:0]=$000000000000_2$ can be divided into gpid[11:4]=$00000000_2$ and gpid[3:0]=$0000_2$. It should be understood that gpid[11:0] represents 12 bits, in which gpid[11:4] represents the former 8 bits, and gpid[3:0] represents the latter 4 bits.

At the beginning, the ONU performs a row look-up. Since gpid[11:4]=$00000000_2$ indicates a row address of the first memory array, which can be converted into a decimal number $0_{10}$, so the ONU identifies that it corresponds to the $0^{th}$ SRAM row.

After the $0^{th}$ SRAM row corresponding to the gpid[11:4]=$00000000_2$ is identified, the ONU has to perform a column look-up. Since gpid[3:0]=$0000_2$ can be converted into a decimal number $0_{10}$, the ONU identifies that gpid[3:0]=$0000_2$ indicates Bit 0. Bit 0 indicates the position of the $1^{st}$ bit of the 16 bits (i.e. LSB) of the SRAM row of the first memory array. The meanings of Bit 0, . . . , Bit 15 may be referred to the section "configuration of first memory array", and will not be described again herein.

Next, it has to determine if the GEM frame belongs to the ONU according to the position of bits that gpid[3:0] indicates. The principle for such determination is that: if the value of the indicated bit is 1, the indicated bit is valid; and, if the value of the indicated bit is 0, the indicated bit is invalid. Accordingly, in this example, since the value of Bit 0 in the $0^{th}$ SRAM row is 0, it can be determined that the GEM frame with the GEM Port ID=0 does not belong to the ONU.

In this example, since it has been determined that the GEM frame with the GEM Port ID=0 does not belong to the ONU, there is no need to make a further determination about which GEM Port is used by the GEM frame.

The second example is GEM Port ID=32, that is gpid[11:0]=$32_{10}$=$00000010000_2$. According to the principle of the present invention, gpid[11:0]=$000000100000_2$ can be divided into gpid[11:4]=$00000010_2$ and gpid[3:0]=$0000_2$.

At the beginning, the ONU performs a row look-up. Since gpid[11:4]=$00000010_2$ indicates a row address of the first memory address, which can be converted into a decimal number $2_{10}$, so the ONU identifies that it corresponds to the $2^{nd}$ SRAM row.

After the $2^{nd}$ SRAM row corresponding to gpid[11:4]=$00000010_2$ is identified, the ONU has to perform a column look-up. Since gpid[3:0]=$0000_2$ can be converted into a decimal number 0, the ONU identifies that gpid[3:0]=$0000_2$ indicates Bit 0. Bit 0 indicates the position of the $1^{st}$ bit of the 16 bits (i.e. LSB) of the SRAM row of the first memory array.

Next, it has to determine if the GEM frame belongs to the ONU according to the position of the bit that gpid[3:0] indicates. In this example, since the value of Bit 0 in the $2^{nd}$ SRAM row is 1, it can be determined that the ONU has the GEM Port ID=32.

(Specific Description of Method for Counting a GPON GEM Frame)

With reference back to the example of FIG. 5, after identifying that the GEM frame with GEM Port ID=32 belongs to the ONU, it has to further identify the position of the specific GEM Port. At first, a row look-up is performed in the first memory array. In particular, after the $2^{nd}$ SRAM row of the first memory array is identified based on gpid [11:4]=$00000010_2$, the ONU identifies that gpid[3:0]=$0000_2$=$0_{10}$ indicates Bit 0 according to gpid[3:0]=$0000_2$=$0_{10}$. Bit 0 indicates the position of the $1^{st}$ bit of the 16 bits (i.e. LSB) of the SRAM row of the first memory array, and thereby identifies that the GEM Port is the $1^{st}$ GEM Port in the $2^{nd}$ SRAM row of the first memory array (this GEM Port refers to the first memory cell).

Next, a row look-up is performed in the second memory array. Since gpid[11:4]=$00000010_2$ indicates a row address of the first memory array and $00000010_2$ can be converted into a decimal number $2_{10}$, it can be determined that gpid[11:4]=$00000010_2$ corresponds to the $2^{nd}$ SRAM row. Then, the data $00000100_2$ stored in the $2^{nd}$ SRAM row will be outputted. The data $00000100_2$ can be converted into a decimal number $4_{10}$, which means that, in the first memory array, there are totally four valid GEM Ports in the SRAM rows before the $2^{nd}$ SRAM row. Since the GEM Port with GEM Port ID=32 is the first GEM Port in the $2^{nd}$ SRAM row of the first memory array, so it can be concluded that the GEM Port with GEM Port ID=32 is the fifth GEM Port.

In brief, the process of identifying the specific GEM Port uses the result obtaining from the first memory array (i.e., the obtained result is an indication, which in this example is Bit 0 in the $2^{nd}$ SRAM row), and then uses the result obtaining from the second memory array (the second data). As a result, the specific GEM Port according to the GEM Port ID is obtained.

According to the aforementioned counting method, by summing up the second portion GEM Port ID and the second data, a summation result is obtained. The summation result is then defined as a counter index. By adding 1 and 4, it can be derived that the GEM frame with GEM Port ID=32 belongs to the fifth GEM Port of the ONU.

Next, when the counter set searching is performed, the fifth GEM port gives a value "5", which can be converted into a binary number $00000101_2$ and $00000101_2$ is used as a counter index to find a corresponding counter set.

In the present invention, the space of the first memory array takes 256×16 bits, and the space of the second memory array takes 256×8 bits, so their total area takes 6144 bits, which is smaller than the space of the memory array in the referential example that takes 4096×9=36864 bits. It can be seen that, the present invention significantly save a memory space of 3840×8=30720 bits. The memory space of the present invention merely needs one-sixth of that of the referential example, according to the ratio of 6144 to 36864.

Comparison Between the Referential Example and the Embodiment

Figure 6:
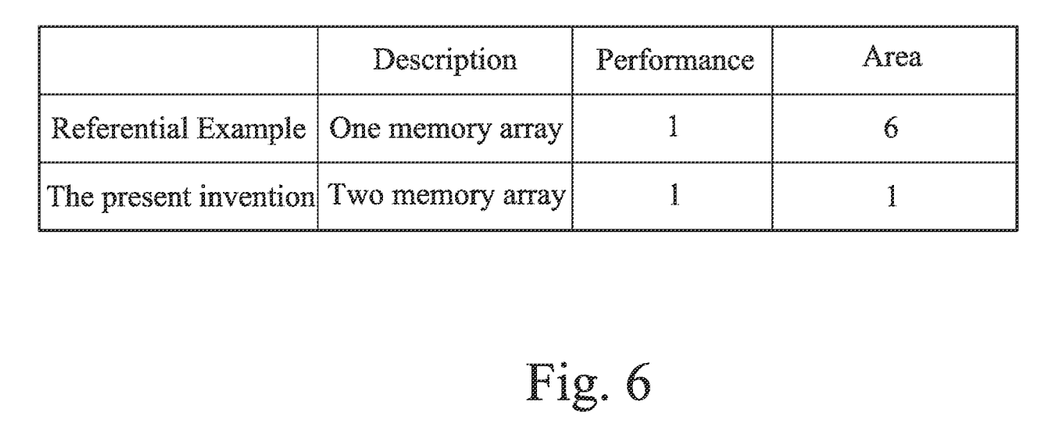
FIG. 6 shows a table that compares the referential example and the embodiment.

FIG. 6 shows a table that compares the referential example to the embodiment.

Now, given the same performance (i.e. one ONU supports 256 GEM Ports), it can be found through the comparison table of FIG. 6 that, the referential example (with one memory array) requires an SRAM area having at least 36864 bits; while, in the embodiment of the present invention (with two memory arrays) requires a total area of the first memory array and the second memory array having merely 6144 bits, which is only one-sixth of the SRAM area of the referential example. Apparently, the present invention is very advantageous in SRAM area reduction.

In summary, according to the method of the present invention, the searching process firstly finds out which position of which row in the first memory array is indicated by the GEM Port ID, and then obtains the corresponding summation result by means of the second memory array. A counter set for count can be calculated accordingly.

Thus, the method proposed by the present invention has the benefit of significantly reducing the SRAM area. As a result, the method for fast searching and counting a GEM frame is realized.

Although the present invention has been explained in relation to its preferred embodiment, it is to be understood that many other possible modifications and variations can be made without departing from the spirit and scope of the invention as hereinafter claimed.

What is claimed is:

1. A searching method, applicable to Gigabit-capable Passive Optical Network (GPON), the searching method comprising:
   dividing a GPON Encapsulation Mode Port Identifier (GEM Port ID) of a GEM frame into a first portion GEM Port ID and a second portion GEM Port ID;
   performing a row look-up in a first memory array by using the first portion GEM Port ID, and performing a column look-up in the first memory array by using the second portion GEM Port ID; and
   identifying a specific bit's position in the first memory array, according to results of the row look-up and the column look-up in the first memory array, wherein the specific bit's position represents a GPON Encapsulation Mode Port (GEM Port) that is used by the GEM frame.

2. The searching method as claimed in claim 1, wherein the searching method further comprises: determining if the GEM frame belongs to an Optical Network Unit (ONU) based on a value of the specific bit's position by the ONU.

3. The searching method as claimed in claim 1, wherein the searching method further comprises: performing a row look-up in the first memory array by using the first portion GEM Port ID to obtain a specific GEM Port.

4. The searching method as claimed in claim 1, wherein the first memory array has a plurality of memory rows, the plurality of memory rows having respective row addresses, and wherein data stored in the plurality of memory rows comprise a plurality of bits, each bit representing a respective GEM Port.

5. The searching method as claimed in claim 4, wherein the second memory array is configured such that, except data in a $0^{th}$ memory row, data in a $M^{th}$ memory row are represented by $$\sum_{N=0}^{M-1} Q_N,$$

and wherein M is in a range from 0 to 255, $Q_N$ being a number of valid bits in a $N^{th}$ row of the first memory array, $\Sigma$ being a summation operator, and wherein the second memory array is configured to define a value in the $0^{th}$ memory row as 0.

6. A Gigabit-capable Passive Optical Network (GPON) Optical Network Unit (ONU) integrated circuit, the GPON ONU integrated circuit comprising:
 a first memory array, which is constituted by a plurality of first memory rows, comprising a plurality of memory cells, each memory cell representing a GPON Encapsulation Mode Port (GEM Port), data stored in each memory cell indicating a validity of a relevant GEM Port; and
 a second memory array constituted by a plurality of second memory rows, wherein an order of arranging the second memory rows in the second memory array is the same as an order of arranging the first memory rows in the first memory array, and wherein a second data stored in the second memory row is a total number of valid GEM Ports of all memory rows arranged before a corresponding first memory row, and wherein the second data is associated with a counter index.

7. The integrated circuit as claimed in claim 6, wherein the plurality of first memory rows and the plurality of second memory rows have the same row addresses.

8. The integrated circuit as claimed in claim 6, wherein a number of bits in the second memory rows allows to represent a maximum number of GEM Ports that the GPON ONU integrated circuit supports.

9. A searching method applicable to a GPON (Gigabit-capable Passive Optical Network) ONU (Optical Network Unit) integrated circuit,
 the GPON ONU integrated circuit comprising:
 a first memory array, which is constituted by a plurality of first memory rows, comprising a plurality of memory cells, each memory cell representing a GPON Encapsulation Mode Port (GEM Port), data stored in each memory cell indicating a validity of a relevant GEM Port; and
 a second memory array constituted by a plurality of second memory rows, wherein an order of arranging the second memory rows in the second memory array is the same as an order of arranging the first memory rows in the first memory array, and wherein a second data stored in the second memory row is a total number of valid GEM Ports of all memory rows arranged before a corresponding first memory row, and wherein the second data is associated with a counter index,
 the searching method comprising:
 identifying a first memory cell by performing a look-up in the first memory array with a GPON Encapsulation Mode Port Identifier (GEM Port ID) under test;
 obtaining the second data by performing a row look-up in the second memory array with the GEM Port ID under test, in response to an event that the first memory cell is valid;
 identifying the counter index based on the second data.

10. The searching method as claimed in claim 9, wherein the step of identifying the counter index based on the second data comprises:
 identifying the counter index based on the GEM Port ID under test and the second data.

11. The searching method as claimed in claim 10, wherein the searching method further comprises:
 dividing the GEM Port ID into a first portion GEM Port ID and a second portion GEM Port ID, wherein the step of identifying a first memory cell by performing the look-up in the first memory array with the GEM Port ID under test comprises:
 performing a row look-up in the first memory array by using the first portion GEM Port ID; and
 performing a column look-up in the first memory array by using the second portion GEM Port ID.

12. The searching method as claimed in claim 11, wherein the step of obtaining the second data by performing the row look-up in the second memory array with the GEM Port ID under test, in response to an event that the first memory cell is valid comprises:
 identifying a corresponding row in the plurality of second memory rows by performing the row look-up in the second memory array with the first portion GEM Port ID; and
 providing the second data by the corresponding row in the second memory rows.

13. The searching method as claimed in claim 12, wherein the step of the identifying the counter index based on the GEM Port ID under test and the second data further comprises:
 obtaining a summation result by summing up the second portion GEM Port ID and the second data; and
 deeming the summation result as the counter index.

* * * * *